US008934075B2

(12) United States Patent
Ishihara et al.

(10) Patent No.: US 8,934,075 B2
(45) Date of Patent: Jan. 13, 2015

(54) LIQUID CRYSTAL DISPLAY DEVICE COMPRISING A P-TYPE LIQUID CRYSTAL MATERIAL AND A FIRST ALIGNMENT LAYER HAVING AN ANCHORING ENERGY

(75) Inventors: Shoichi Ishihara, Osaka (JP); Takehisa Sakurai, Osaka (JP); Mitsuhiro Murata, Osaka (JP); Shuichi Kozaki, Osaka (JP); Tadashi Ohtake, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 786 days.

(21) Appl. No.: 13/254,281

(22) PCT Filed: Mar. 17, 2010

(86) PCT No.: PCT/JP2010/054561
§ 371 (c)(1),
(2), (4) Date: Sep. 1, 2011

(87) PCT Pub. No.: WO2010/137386
PCT Pub. Date: Dec. 2, 2010

(65) Prior Publication Data
US 2011/0310337 A1    Dec. 22, 2011

(30) Foreign Application Priority Data

May 27, 2009  (JP) .................................. 2009-127932
Jan. 15, 2010  (JP) .................................. 2010-006689

(51) Int. Cl.
G02F 1/1337      (2006.01)
G02F 1/1343      (2006.01)
G02F 1/139       (2006.01)

(52) U.S. Cl.
CPC ........ G02F 1/134363 (2013.01); G02F 1/1395 (2013.01); G02F 2001/133742 (2013.01); G02F 2001/134381 (2013.01)
USPC ........................................ 349/130

(58) Field of Classification Search
USPC .................................................. 349/123–136
See application file for complete search history.

(56) References Cited

U.S. PATENT DOCUMENTS 4,917,472 A    4/1990    Margerum et al.
6,181,402 B1   1/2001    Shim et al.
(Continued)

FOREIGN PATENT DOCUMENTS

EP    2 290 437 A1    3/2011
JP    57-618          1/1982
(Continued)

OTHER PUBLICATIONS

International Search Report for PCT/JP2010/054561, mailed Apr. 13, 2010.
(Continued)

*Primary Examiner* — Paul Lee
(74) *Attorney, Agent, or Firm* — Nixon & Vanderhye, P.C.

(57) ABSTRACT

The present invention provides a liquid crystal display device that can suppress a display defect due to collapse of liquid crystal alignment. The present invention provides a liquid crystal display device comprising a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and the first alignment layer has an anchoring energy of not greater than $1.5 \times 10^{-4}$ J/m$^2$.

22 Claims, 8 Drawing Sheets

(56) References Cited

U.S. PATENT DOCUMENTS

| | | |
|---|---|---|
| 6,512,564 B1 | 1/2003 | Yoshida et al. |
| 6,661,488 B1 | 12/2003 | Takeda et al. |
| 6,704,083 B1 | 3/2004 | Kim et al. |
| 6,724,452 B1 | 4/2004 | Takeda et al. |
| 6,727,968 B1 | 4/2004 | Bryan-Brown et al. |
| 6,781,657 B1 | 8/2004 | Kim et al. |
| 6,982,774 B1 | 1/2006 | Nomura et al. |
| 7,167,224 B1 | 1/2007 | Takeda et al. |
| 7,224,421 B1 | 5/2007 | Takeda et al. |
| 7,304,703 B1 | 12/2007 | Takeda et al. |
| 2003/0086044 A1 | 5/2003 | Inoue et al. |
| 2003/0112394 A1 | 6/2003 | Yoshida et al. |
| 2003/0197824 A1 | 10/2003 | Shim et al. |
| 2004/0066480 A1* | 4/2004 | Yoshida et al. ............ 349/123 |
| 2004/0114084 A1 | 6/2004 | Kim et al. |
| 2004/0119924 A1 | 6/2004 | Takeda et al. |
| 2004/0233365 A1 | 11/2004 | Yoshida et al. |
| 2005/0151908 A1 | 7/2005 | Nomura et al. |
| 2005/0151911 A1 | 7/2005 | Kim et al. |
| 2005/0151915 A1 | 7/2005 | Nomura et al. |
| 2005/0248702 A1 | 11/2005 | Hoshino |
| 2006/0077332 A1* | 4/2006 | Ohmuro et al. ............ 349/144 |
| 2007/0024784 A1 | 2/2007 | Yoshida et al. |
| 2007/0064187 A1 | 3/2007 | Takeda et al. |
| 2007/0097305 A1 | 5/2007 | Lin et al. |
| 2008/0165314 A1 | 7/2008 | Takeda et al. |
| 2008/0180620 A1 | 7/2008 | Iwamoto et al. |
| 2008/0284953 A1 | 11/2008 | Takahashi et al. |
| 2008/0303997 A1 | 12/2008 | Takeda et al. |
| 2008/0309862 A1 | 12/2008 | Yoshida et al. |
| 2008/0309863 A1 | 12/2008 | Yoshida et al. |
| 2008/0316408 A1 | 12/2008 | Yoshida et al. |
| 2009/0207360 A1 | 8/2009 | Takeda et al. |
| 2010/0002158 A1* | 1/2010 | Ishihara et al. ............ 349/33 |
| 2010/0315582 A1 | 12/2010 | Kim et al. |

FOREIGN PATENT DOCUMENTS

| | | |
|---|---|---|
| JP | 2-190825 | 7/1990 |
| JP | 2-503482 | 10/1990 |
| JP | 3-150530 | 6/1991 |
| JP | 6-250184 | 9/1994 |
| JP | 6-250184 A | 9/1994 |
| JP | 10-186351 | 7/1998 |
| JP | 10-333171 | 12/1998 |
| JP | 11-24068 | 1/1999 |
| JP | 11-242225 | 9/1999 |
| JP | 2000-275642 | 10/2000 |
| JP | 2000-275682 | 10/2000 |
| JP | 2001-108995 | 4/2001 |
| JP | 2002-55357 | 2/2002 |
| JP | 2005-331935 | 12/2005 |
| JP | 2008-180923 | 8/2008 |
| JP | 2008-181140 | 8/2008 |
| JP | 2008-233412 | 10/2008 |
| WO | WO 89/08862 | 9/1989 |

OTHER PUBLICATIONS

Sasaki et al., "Surface anchoring energy of liquid crystal with negative dielectric anisotropy determined by saturation voltage method", *Extended Abstracts; The 53rd Spring Meeting of The Japan Society of Applied Physics*, 2006, p. 1365, No. 23a-P-6.

International Preliminary Report on Patentability mailed Dec. 22, 2011 in corresponding PCT Application No. PCT/JP2010/054561.

Partial English Translation of Japanese Office Action issued in Application No. 2011-515937, dated Oct. 9, 2012.

* cited by examiner

Bend-shaped alignment (a)

(b)

(c)

(a)

(b)

LIQUID CRYSTAL DISPLAY DEVICE COMPRISING A P-TYPE LIQUID CRYSTAL MATERIAL AND A FIRST ALIGNMENT LAYER HAVING AN ANCHORING ENERGY

This application is the U.S. national phase of International Application No. PCT/JP2010/054561 filed 17 Mar. 2010 which designated the U.S. and claims priority to JP Patent Application No. 2009-127932 filed 27 May 2009 and JP Patent Application No. 2010-006689 filed 15 Jan. 2010, the entire contents of each of which are hereby incorporated by reference.

TECHNICAL FIELD

The present invention relates to a liquid crystal display device. Specifically, the present invention relates to a liquid crystal display device suitable for a display mode of controlling light transmission by bend-deforming a liquid crystal layer by voltage application.

BACKGROUND ART

A liquid crystal display device is characterized in a low profile, a light weight, and low power consumption, and it is extensively used in various fields. Further, its display performance has greatly advanced with the lapse of time and has gained an advantage over a CRT (Cathode Ray Tube).

A display mode of the liquid crystal display device is determined by how liquid crystal is aligned in cells. In conventional technologies, various display modes are known as display modes of the liquid crystal display device, such as a TN (Twisted Nematic) mode, an MVA (Multi-domain Vertical Alignment) mode, an IPS (In-plane Switching) mode, an OCB (Optically self-Compensated Birefringence) mode, and others.

A large number of liquid crystal display devices using such a display mode are mass-produced. In particular, for example, a liquid crystal display device adopting the TN mode is widely generally used. However, the liquid crystal display device adopting the TN mode can be improved in point of a slow response, a narrow viewing angle, and others.

On the other hand, in the MVA mode, a slit is provided in a pixel electrode of an active matrix substrate, protrusions (ribs) for alignment control over liquid crystal molecules are provided on the opposite electrode of the opposite substrate, and these members form a fringe field to align the liquid crystal molecules in multiple directions. Further, in the MVA mode, a direction along which the liquid crystal molecules tilt by voltage application is divided into multiple directions (multi-domain), thereby achieving a wide viewing angle (see, e.g., Patent Document 1). Furthermore, since the MVA mode is a homeotropic alignment mode, it achieves higher contrast than the TN, IPS, and OCB modes. However, the MVA mode can be improved in point of a complicated manufacturing process and a slow response similarly to the TN mode.

As a display mode other than those described above, there has been proposed a display mode in which a p-type nematic liquid crystal is adopted as a liquid crystal material and a transverse electric field generated by a comb-shaped electrode is utilized to drive the liquid crystal in the homeotropic alignment mode (which will be also referred to as a TBA (Transverse Bend Alignment) mode hereinafter) in order to solve process problems in the MVA mode (see, e.g., Patent Documents 2 to 7).

The TBA mode also has the following characteristics as compared with the MVA mode. First, a high-speed response is possible. Moreover, high contrast based on homeotropic alignment can be achieved. Additionally, a wide viewing angle can be achieved. Further, in the TBA mode, since alignment control using protrusions is not necessary and a pixel configuration is simple, manufacture can be readily performed. That is, a cost can be reduced.

There has been disclosed, as a technique for controlling alignment of a liquid crystal using a fine structure, a technique for forming multiple tilted surfaces facing a predetermined direction on an alignment film surface (see, e.g., Patent Document 8). Further, a technique for forming irregularities whose heights periodically vary on a substrate surface has been disclosed (see, e.g., Patent Document 9).

Moreover, there has been disclosed a method for evaluating an anchoring energy based on a saturation threshold method (see, e.g., Non-Patent Literature 1).

Patent Document 1: JP 11-242225 A
Patent Document 2: JP 57-618 A
Patent Document 3: JP 10-186351 A
Patent Document 4: JP 10-333171 A
Patent Document 5: JP 11-24068 A
Patent Document 6: JP 2000-275682 A
Patent Document 7: JP 2002-55357 A
Patent Document 8: JP 3-150530 A
Patent Document 9: JP 2005-331935 A
Non-Patent Literature 1: Yoshikazu SASAKI and two others, "Surface anchoring energy of liquid crystal with negative dielectric anisotropy determined by saturation voltage method", Extended Abstracts; The 53rd Spring Meeting of The Japan Society of Applied Physics (Spring in 2006, Musashi Institute of Technology), 2006, p. 1365, No. 23a-P-6

SUMMARY OF THE INVENTION

The TBA mode will be taken as an example to explain problems of the present invention hereinafter, but the present invention is not restricted to the TBA mode.

The present inventors are the first ones who have discovered that liquid crystal alignment collapses and a display defect occurs particularly when a high voltage is applied in the TBA mode as shown in FIG. 10. In FIG. 10, the liquid crystal alignment has collapsed at bright portions. When no voltage is applied, black display is obtained because polarizers are orthogonal to each other, and bright lighting starts from positions near electrodes in response to voltage application. When an excessive voltage is applied, the liquid crystal alignment collapses in an inter-electrode region, and light leakage (emission of irregularly polarized light) occurs. At this time, normally lighted portions and portions where the alignment has collapsed and the light leakage has occurred are observed at the same time. Although the observation can be satisfactorily carried out because of a difference in luminance, FIG. 10 shows a photograph taken when the applied voltage is once eliminated and homeotropic alignment is provided in the normal portions (i.e., at the time of black display). In the TBA mode, as shown in FIG. 11, the liquid crystal is aligned in an arched (bending) state in a cell by electric field application. Further, the curvature of the formed bend is gradually reduced as an applied voltage is increased. When the curvature of each bend is excessively reduced due to an increase in the applied electric field, free energy of a system in the cell is increased. Therefore, it is considered that the system advances in a direction along which strain of the bend is eliminated and the bending liquid crystal alignment thereby collapses.

The present invention is devised in view of the above-described existing circumstances, and an object of the present invention is to provide a liquid crystal display device that can suppress a display defect due to collapse of liquid crystal alignment.

The present inventors have conducted studies on a liquid crystal display device that can suppress a display defect due to collapse of liquid crystal alignment, and they have paid attention to deformation of the liquid crystal, i.e., easiness of change in the liquid crystal alignment. Further, they have revealed that the deformation of the liquid crystal can be facilitated by reducing binding force of the liquid crystal on an alignment layer interface to make it easy to deform the liquid crystal, preparing a liquid crystal material that is easily deformed, and/or controlling a substrate interface to urge the deformation of the liquid crystal. More specifically, the deformation can be facilitated by (1) a conformation that the liquid crystal material has a bending elastic constant k33 of k33≤14 pN; (2) a conformation that the alignment layer has an anchoring energy of not greater than $1.5 \times 10^{-4}$ J/m$^2$; (3) a conformation that the alignment layer includes an alignment film having a fluorine-containing group; (4) a conformation that the alignment layer includes a chemisorption film; (5) a conformation that the alignment layer includes irregularities configured to control alignment of a p-type liquid crystal material; (6) a conformation that the p-type liquid crystal material contains liquid crystal molecules that previously tilt when no voltage is applied in a direction along which they tilt when a voltage is applied; and (7) a conformation that a comb-shaped electrode has a tilted portion on its surface on the liquid crystal layer side, or by a combination of these conformations. The present inventors have conceived of excellently solving the above-described problems, thereby attaining the present invention.

That is, the present invention provides a liquid crystal display device that comprises a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and a liquid crystal material that constitutes the liquid crystal layer has a bending elastic constant k33 that satisfies k33≤14 pN.

Further, the present invention provides a liquid crystal display device that comprises a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and the first alignment layer has an anchoring energy of not greater than $1.5 \times 10^{-4}$ J/m$^2$.

Furthermore, the present invention provides a liquid crystal display device that comprises a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and the first alignment layer comprises an alignment film having a fluorine-containing group.

Further, the present invention provides a liquid crystal display device that comprises a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and the first alignment layer comprises a chemisorption film.

Further, the present invention provides a liquid crystal display device that comprises a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and the first alignment layer has irregularities configured to control alignment of the p-type liquid crystal material on its surface that is in contact with the liquid crystal layer.

Further, the present invention provides a liquid crystal display device that comprises a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and the p-type liquid crystal material includes liquid crystal molecules that are previously tilted when no voltage is applied in a direction along which they are designed to be tilted by voltage application.

Further, the present invention provides a liquid crystal display device that comprises a liquid crystal display element including a pair of substrates and a liquid crystal layer hermetically interposed between the pair of substrates, wherein the liquid crystal layer includes a p-type liquid crystal material that is homeotropically aligned with respect to surfaces of the pair of substrates when no voltage is applied; one of the pair of substrates comprises a comb-shaped electrode and a first alignment layer configured to control alignment of the p-type liquid crystal material; the other of the pair of substrates comprises a second alignment layer configured to control alignment of the p-type liquid crystal material; and the comb-shaped electrode having a tilted portion on its surface on the liquid crystal layer side.

The terms "homeotropic", "vertical", and the terms derived therefrom do not mean exact verticality, and it includes a state that can be treated alike vertical and a substantially vertical state in view of effects of the present invention. Moreover, errors that can be possibly produced in a manufacturing process may be included.

The configuration of the liquid crystal display device of the present invention is not especially limited as long as it essentially includes such components. The liquid crystal display device may or may not include other components.

The respective embodiments of the liquid crystal display device according to the present invention may be appropriately combined with each other. That is, each of the above embodiments may appropriately have a configuration of other embodiments of the liquid crystal display device according to the present invention.

Preferable embodiments of the liquid crystal display device of the present invention are mentioned in more detail below. The following embodiments may be combined with each other.

In view of more assuredly achieving the effects of the present invention, the second alignment layer preferably has an anchoring energy of not greater than $1.5 \times 10^{-4}$ J/m$^2$.

In the same view, the anchoring energy of the first alignment layer is preferably not greater than $1 \times 10^{-4}$ J/m$^2$.

In the same view, the anchoring energy of the second alignment layer is preferably not greater than $1 \times 10^{-4}$ J/m$^2$.

In the same view, the second alignment layer preferably comprises an alignment film having a fluorine-containing group.

In the same view, the second alignment layer preferably comprises a chemisorption film.

In the same view, the second alignment layer preferably has irregularities configured to control alignment of the p-type liquid crystal material on its surface that is in contact with the liquid crystal layer.

In the same view, the bending elastic constant k33 preferably satisfies k33≤13 pN, and more preferably satisfies k33≤12.5 pN.

In the same view, the liquid crystal molecules are preferably adjacent to the first alignment layer.

In the same view, the tilted portion preferably tilts in a direction along which the liquid crystal molecules included in the p-type liquid crystal material are designed to be tilted by voltage application.

The fluorine-containing group is preferably a $CF_2$ group.

Introduction of a fluorine-containing group (a F-based functional group) causes reduction in the surface energy, thereby enabling smooth rotation of the liquid crystal molecules. Further, since the effect of this fluorine-containing group is enhanced as a ratio of fluorine atoms increases, introduction of a $CF_2$ group is very effective.

Specifically, the irregularities are preferably two-dimensionally arrayed in a pixel.

More specifically, the irregularities preferably provide the liquid crystal layer with a pre-tilt angle.

That is, the liquid crystal layer preferably has a pre-tilt formed by the irregularities when no voltage is applied.

the liquid crystal layer preferably has a pre-tilt angle of not smaller than 87° and smaller than 90°. A pre-tilt angle of smaller than 87° may cause a low contrast ratio.

Specifically, the p-type liquid crystal material is preferably a p-type nematic liquid crystal material.

According to the liquid crystal display device of the present invention, a display defect due to collapse of liquid crystal alignment can be suppressed.

BRIEF DESCRIPTION OF THE DRAWINGS

FIG. 6(a) is a plan view, FIG. 6(b) is a right side view, and FIG. 6(c) is a lower side view.

FIG. 7(a) shows the first irradiation and FIG. 7(b) shows the second irradiation.

MODES FOR CARRYING OUT THE INVENTION

In the present specification, the anchoring energy was calculated using a parallel plate electrode cell by measuring a capacitance of the cell while changing an applied voltage, and then plotting a graph of dC/dV vs. 1/V. For details, see Non-patent Literature 1.

The parallel plate electrode cell is a regular test cell having two glass substrates each of which has a transparent electrode on its entire surface, and a liquid crystal layer which is disposed between the substrates with spacers put therebetween. Further, an alignment layer that should be measured is formed on a surface of each of the two glass substrates on the liquid crystal layer side. Here, the same alignment layers are usually formed on the two glass substrates.

The pre-tilt angle was measured using Optipro which is an ellipsometer manufactured by Shintech Inc. The measuring method was as follows: a polarized state (stokes parameters) of transmitted light was measured at a polar angle of −30° to +30° in an orientation in which liquid crystal molecules tilt, and a pre-tilt angle of a measurement sample was determined by fitting the relationship between a pre-tilt angle calculated based on an optical simulation and the polarized state.

The present invention will be described in more detail hereinafter based on embodiments with reference to the drawings. Here, the present invention is not restricted to these embodiments.

Embodiment 1

In a liquid crystal display device of the present embodiment, distribution of an electric field intensity is formed in a cell by applying an electric field, thereby achieving bend alignment of liquid crystal. Additionally, the liquid crystal display device of the present embodiment is a liquid crystal display device in which an electric field is applied to a homeotropically aligned p-type nematic liquid crystal (nematic liquid crystal having positive dielectric anisotropy) transversely with respect to a substrate surface, wherein a bending array is formed by the electric field application. Further, an alignment orientation of liquid crystal molecules is determined by the electric field. The electric field may have a component parallel to the substrate surface.

Further, the liquid crystal display device of the present embodiment includes a liquid crystal display element (cell), a driver circuit, and a backlight (an illumination device). Configurations of the driver circuit and the backlight are the same as those of conventional ones. Therefore, a description on these configurations is omitted herein.

Figure 1:
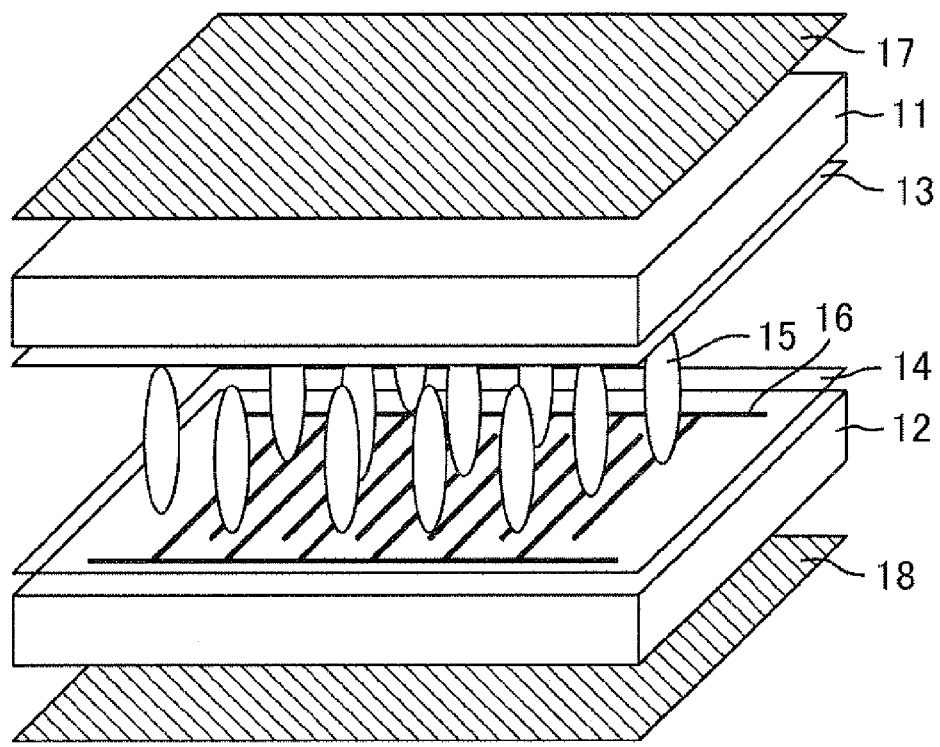
FIG. 1 is a perspective schematic view showing a basic configuration of a liquid crystal display device according to Embodiment 1.

As shown in FIG. 1, the liquid crystal display element of the present embodiment has two transparent substrates, i.e., a substrate (an upper substrate) 11 and a substrate (a lower substrate) 12, and a liquid crystal material containing a p-type nematic liquid crystal (which will be also simply referred to as "liquid crystal molecules" hereinafter) 15 is hermetically interposed between the two transparent substrates 11 and 12 to form a liquid crystal layer.

Moreover, alignment layers 13 and 14 that are members configured to control alignment of the liquid crystal material, especially the p-type nematic liquid crystal 15, are arranged on the substrates 11 and 12. The alignment layers 13 and 14 align the liquid crystal material, especially the p-type nematic liquid crystal 15, to be substantially homeotropic to main surfaces of the substrates 11 and 12 when no electric field (voltage) is applied.

Therefore, the p-type nematic liquid crystal 15 is homeotropically aligned when no voltage is applied. More specifically, the long axis of each liquid crystal molecule 15 near the alignment layers 13 and 14 is aligned to substantially homeotropically face the respective main surfaces of the substrates 11 and 12. It is to be noted that precise control over a pre-tilt angle is not required in the display mode of the present embodiment.

Further, a comb-shaped electrode 16 is formed on the substrate 12. The comb-shaped electrode 16 has a configuration that a comb-shaped common electrode group and a comb-shaped pixel electrode group are oppositely arranged to face each other. The common electrode group includes multiple common electrodes parallel to each other and the respective common electrodes are connected to each other in a peripheral region of a pixel (or a sub-pixel). A signal (a common signal) common to the respective pixels (or sub-pixels) is supplied to the common electrode group. The pixel electrode group also includes multiple pixel electrodes parallel to each other, and the respective pixel electrodes are connected to each other in the peripheral region of the pixel (or the sub-pixel). The pixel electrode group is provided in association with each pixel (or each sub-pixel), and an image signal is supplied to the pixel electrode group in accordance with each pixel (or each sub-pixel) at a predetermined timing.

Moreover, polarizers 17 and 18 are arranged on outer main surfaces of the two substrates 11 and 12, respectively.

Patent Document 2 discloses such a cell configuration. Further, Patent Documents 4 and 5 disclose a configuration that a bend-shaped electric field is formed by electric field application, and two domains each having a 180° different director orientation are formed, thereby achieving a wide-viewing-angle characteristic.

Additionally, the present inventors have already filed an application which includes achievement of high transmittance, a wide viewing angle, and rapid response by optimization of an electrode width L and an electrode spacing (a gap between electrodes) S of the comb-shaped electrode 16 and a liquid crystal layer thickness (a cell gap) d. However, as described above, there is a problem in alignment stability when a high voltage is applied.

In the display mode of the present embodiment, gradation display is performed between bend alignment when a high voltage is applied and homeotropic alignment when no voltage is applied. A maximum curvature at this moment depends on an applied voltage, and it increases as an electric field intensity rises. That is, the maximum curvature when a high voltage is applied can be controlled based on the electrode width L, the electrode spacing S, the liquid crystal layer thickness d, and others. Therefore, the maximum curvature when a high voltage is applied can be set to a value in the OCB mode or a higher value, whereby more rapid response than that in the OCB mode can be achieved. The curvature used herein means "a level of bending" and it is not physically defined.

However, if "the level of bending" is higher than needs, the bend alignment collapses as if a rod is bent. On the other hand, in the present embodiment, a stable bend alignment state can be achieved by, e.g., reducing the anchoring energy of the alignment layers 13 and 14. This is equivalent to a state that a glass thin plate is immediately broken when it is bent but a plastic setting board is not broken even though it is greatly bent.

Figure 2:
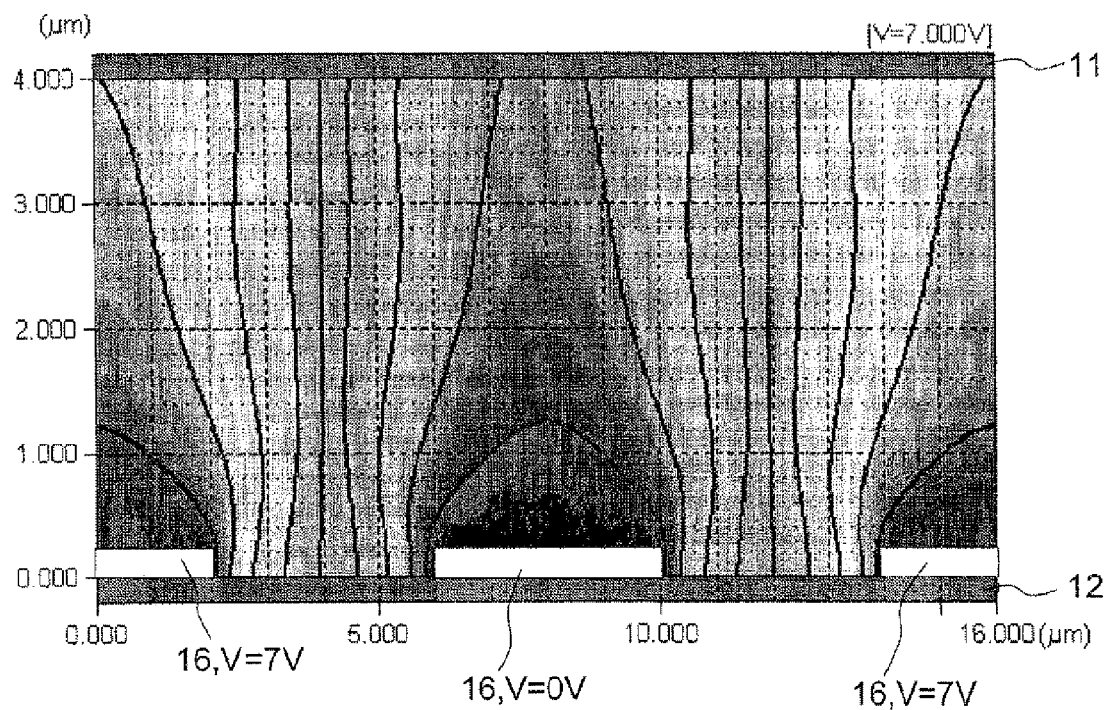
FIG. 2 is a cross-sectional schematic view of the liquid crystal display device according to Embodiment 1 showing one example of a potential distribution in a cell when a voltage is applied.
Figure 3:
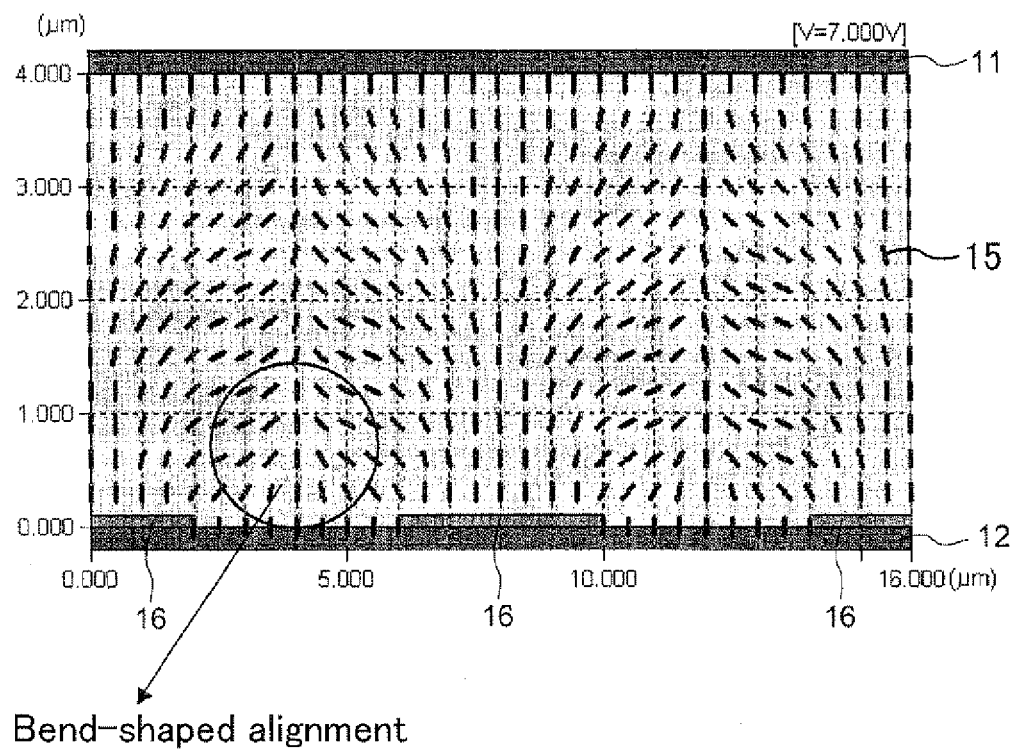
FIG. 3 is a cross-sectional schematic view of the liquid crystal display device according to Embodiment 1 showing one example of a liquid crystal alignment distribution when a voltage is applied.

FIG. 2 shows equipotential curves in a cell when a voltage of 7 V is applied. At this time, the liquid crystal molecules 15 are aligned in accordance with this electric field intensity distribution and binding force from an interface. FIG. 3 shows the state at this moment. The liquid crystal molecules 15 are continuously changed from homeotropic alignment to bend-shaped alignment in response to voltage application. In more detail, a line of electric force at a gap of the comb-shaped electrode 16 semicircularly bends when an electric field is applied, thereby forming a bend-shaped (arched) electric field. Therefore, as shown in FIG. 3, the liquid crystal molecules 15 are bend-aligned to form an arched pattern in a substrate thickness direction. As a result, birefringence is shown with respect to light traveling in a direction vertical to the substrate surfaces.

As described above, in regular driving, the liquid crystal layer always shows bend-shaped alignment, and rapid response can be achieved as a response between different tones. Further, since two domains that have 180° different director orientations are formed, a wide-viewing-angle characteristic can be achieved.

In the case of performing regular driving, the bending alignment does not collapse. However, the liquid crystal alignment may collapse in some cases when, for example, an influence of a transverse electric field cannot be ignored in TFT driving.

Additionally, the present inventors have found that the bending alignment of the liquid crystal molecules collapses in the case that the liquid crystal alignment is excessively bent. They have also revealed that collapse of the liquid crystal alignment can be effectively suppressed by making the liquid crystal material itself be capable of coping with bending stress, weakening the anchoring energy on interfaces between the alignment layers 13 and 14 and the liquid crystal layer, tilting a tilt angle of the liquid crystal alignment on each of these interfaces in a direction of the line of electric force, or combining these techniques.

Specific techniques are as follows.

(1) Use a liquid crystal material whose bending elastic constant k33 meets k33≤14 pN.

(2) Set the anchoring energy of the alignment layers 13 and 14 to be not greater than $1.5 \times 10^{-4}$ J/m$^2$.

(3) Use an alignment film having a fluorine-containing group as each of the alignment layers 13 and 14.

(4) Use a chemisorption film as each of the alignment layers 13 and 14.

(5) Use a fine-structure alignment regulation layer as each of the alignment layers 13 and 14.

(6) Previously tilt the liquid crystal molecules in a direction along which they are tilted by voltage application.

(7) Tilt a surface of the comb-shaped electrode on the liquid crystal layer side.

These techniques will be described hereinafter in more detail.

According to the technique (1), deformation of the liquid crystal molecules can be facilitated. That is, use of a deformable liquid crystal material having a relatively small k33 enables easy change in the liquid crystal alignment. Therefore, a display defect due to collapse of the liquid crystal alignment can be suppressed.

In view of suppressing collapse of the liquid crystal alignment, a smaller k33 is preferable and, specifically, k33 is more preferably 13 pN or below, further preferably 12.5 pN or below, and particularly preferably 12 pN or below.

On the other hand, the lower limit in k33 is naturally restricted by the liquid crystal structure. In detail, a liquid crystal material whose k33 is smaller than 6 pN to 8 pN is not realistic. Therefore, k33 is preferably 6 pN or above, and more preferably 8 pN or above.

Further, in the case that liquid crystal physical properties excluding k33, e.g. refractive index anisotropy Δn and dielectric anisotropy Δ∈, are maintained, the liquid crystal is apt to be elastically deformed as k33 is reduced. Therefore, the driving voltage can be decreased as k33 is reduced.

For the purpose of improving stability of the liquid crystal alignment, physical properties excluding k33 of a liquid crystal material are not particularly restricted, and they can be appropriately set. Examples of the liquid crystal material suitable for the display mode used in the present embodiment include materials having a refractive index anisotropy Δn=0.1 to 0.3, and materials having a dielectric anisotropy Δ∈=10 to 25. Particularly preferable is a material that meets the refractive index anisotropy Δn=0.1 to 0.3 and the dielectric anisotropy Δ∈=10 to 25. In view of reliability, it is preferable to use an F (fluorine)-based liquid crystal material. Into the liquid crystal molecules of the F-based liquid crystal material are introduced fluorine atoms, a fluorine-containing group, and others.

Further, the electrode width L, the electrode spacing S, the cell gap d, and others are not particularly restricted and can be appropriately set. The electrode width L is preferably 1 to 5 μm (particularly preferably 2.5 μm), the electrode spacing S is preferably 3.5 to 8 μm, and a product dΔn of the cell gap d and the refractive index anisotropy Δn of the liquid crystal material is preferably 300 to 400 nm.

According to the technique (2), deformation of the liquid crystal molecules can be facilitated. That is, in the case that the anchoring energy (surface anchoring energy, anchoring strength) is set to be relatively small in this manner, binding force of the liquid crystal molecules on the substrate surfaces, i.e., the surfaces of the alignment layers 13 and 14, can be reduced. Thereby, the liquid crystal alignment is easily changed. As a result, a display defect due to collapse of the liquid crystal alignment can be suppressed.

On the other hand, Patent Document 3 mentions that anchoring is small because the liquid crystal is homeotropically aligned; however, it does not clearly describe the specific value of the anchoring energy. Moreover, the homeotropic alignment does not necessarily provide a small anchoring energy.

In view of suppressing collapse of liquid crystal alignment, an anchoring energy is preferably as small as possible. Specifically, it is preferably $1 \times 10^{-4}$ J/m$^2$ or below. Additionally, reduction in the anchoring energy causes a decrease in a threshold voltage.

On the other hand, the lower limit of the anchoring energy is not particularly restricted, and it is preferably $1 \times 10^{-6}$ J/m$^2$ or above. If the anchoring energy is less than $1 \times 10^{-6}$ J/m$^2$, bending alignment formed by voltage application cannot be returned to the alignment before the voltage application even after the voltage was canceled, and the alignment may be in other states in some cases. That is, the memory effect may be unfortunately exercised.

In principle, the anchoring energy of the alignment layers 13 and 14 on the respective substrates 11 and 12 affects the liquid crystal alignment. However, since the electric field intensity is higher on the lower substrate side where the comb-shaped electrode 16 is provided, it can be considered that the liquid crystal alignment is more greatly improved on the lower substrate. That is, even if only the alignment layer 14 on the lower substrate side meets the numeric range of the anchoring energy, the effect may be expected to be achieved to some extent.

Likewise, the later-described techniques (3) to (5) may be applied only to the alignment layer 14 on the lower substrate side.

In view of more assuredly suppressing a display defect due to collapse of the liquid crystal alignment, the techniques (2) to (5) are preferably applied to not only the alignment layer 14 but also the alignment layer 13.

In the case that the alignment layer 13 on the upper substrate side and the alignment layer 14 on the lower substrate side have materials, structures, and others that are different from each other and are formed by different methods, troubles such as image persistence may occur. Therefore, in general, the alignment layer 13 and the alignment layer 14 preferably include the same material and have the same structure, and are preferably formed by the same method.

Likewise, the alignment layer 13 and the alignment layer 14 preferably have the same anchoring energy; they are preferably the same alignment films both having a fluorine-containing group in the technique (3); they are preferably the same chemisorption films in the technique (4); and they preferably have the same fine-structure alignment regulation layer in the technique (5).

Specific means for setting the anchoring energy of the alignment layers 13 and 14 to the above-described range is not particularly restricted, and examples thereof include means using the techniques (3) to (5) or means using a film (an LB film) formed by a Langmuir-Blodgett (LB) method. Particularly preferable is the means using the techniques (3) to (5).

According to the technique (3), the surfaces of the alignment layers 13 and 14 that are in contact with the liquid crystal molecules can be fluorinated. Therefore, the surface energy of the surfaces of the alignment layers 13 and 14 can be greatly reduced, and the anchoring energy of the alignment layers 13 and 14 can be also reduced. As a result, similarly to the technique (2) mentioned above, a display defect due to collapse of the liquid crystal alignment can be suppressed.

Further, affinity for ionic impurities can be reduced, and thus an electric double layer can be less likely to be formed on each of the surfaces of the alignment layers 13 and 14.

The fluorine-containing group is not particularly restricted as long as it is a group containing fluorine. Examples thereof include a $CF_2$ group and a $CF_3$ group. Particularly preferable is a $CF_2$ group.

In regard to the technique (4), the liquid crystal alignment due to the chemisorption films (especially in the homeotropic alignment mode) generally causes a low surface anchoring energy, and this technique is suitable for the present embodiment.

Moreover, any other chemisorption films can be introduced to the alignment layers 13 and 14 by a chemical reaction, and the surface energy thereof can be appropriately controlled. That is, according to the technique (4), molecules constituting the respective chemisorption films are allowed to chemically adsorb other molecules by molecular design. Thus, the surface physical properties of each of the chemisorption film can be appropriately controlled even though the chemisorption film is a super-thin film. The chemisorption film can be modified by molecules containing fluorine atoms, and thus the surface energy of the chemisorption film can be controlled. Therefore, the anchoring energy of the alignment layers 13 and 14 can be reduced, whereby a display defect due to collapse of the liquid crystal alignment can be suppressed in the same manner as in the technique (2) mentioned above.

As described above, the chemisorption film is preferably fluorinated. That is, the technique (4) is preferably combined with the technique (3).

On the other hand, it is not easy to precisely control a pre-tilt angle using the chemisorption film, in general. However, precise control of the pre-tilt angle is not required in the display mode of the present embodiment. Therefore, a chemisorption film that can be formed by a very simple film-forming process can be utilized as the alignment layers 13 and 14 without problems.

Further, since the chemisorption film is a molecule-level super-thin film, voltage loss caused by the alignment layers 13 and 14 can be reduced.

Furthermore, the chemisorption film can be covalently bonded to the substrate and the molecules constituting the chemisorption film can be covalently bonded to each other, thereby forming a robust film.

According to the technique (5), the anchoring energy can be reduced to be one digit smaller than that of a typical alignment film comprising polyimide. As a result, similarly to the technique (2), a display defect due to collapse of the liquid crystal alignment can be suppressed.

The fine-structure alignment regulation layer is a layer that regulates (controls) alignment of the liquid crystal molecules (the p-type nematic liquid crystal) by a surface shape having fine irregularities (structures). That is, the fine-structure alignment regulation layer has fine structures (irregularities) configured to control the alignment of the liquid crystal molecules on its surface that is in contact with the liquid crystal layer.

Moreover, the fine shape alignment regulation layer is configured to set out (align) the liquid crystal based on the elastic theory. For example, on a substrate having a surface shape like a corrugated galvanized sheet, the liquid crystal are likely to be aligned along grooves of the galvanized sheet.

Additionally, the fine irregularities are two-dimensionally and uniformly aligned over substantially the entire region in a pixel as different from ribs that are locally (one-dimensionally) provided in a pixel in the MVA mode.

The specific conformation of the fine shape alignment regulation layer is not particularly restricted, and the configuration described in Patent Document 8 or Patent Document 9 can be utilized, for example.

More specifically, the surface of the substrate having the irregularities formed thereon has a region where a height varies along a first direction in a first cycle and the height varies along a second direction orthogonal to the first direction in a second cycle different from the first cycle. The first cycle is preferably not smaller than 0.1 μm and not greater than 10 μm and the second cycle is preferably not smaller than 0.1 μm and not greater than 10 μm. Further, the liquid crystal layer preferably has a pre-tilt formed by the irregularities when no voltage is applied. As a result, the liquid crystal alignment can be highly accurately controlled.

A method for forming the fine shape alignment regulation layer is not particularly restricted. Examples thereof include photolithography, nanoimprint, stamping, and an ion beam method.

Further, the alignment layers 13 and 14 can substantially homeotropically align the liquid crystal molecules even if these layers only have fine irregularities. However, in view of improving liquid crystal alignment properties, the alignment layers 13 and 14 each preferably further include a homeotropic alignment film formed on the fine irregularities.

According to the technique (6), the liquid crystal alignment can be easily changed, and strain of a liquid crystal director caused by voltage application to the comb-shaped electrode 16 can be eased. As a result, occurrence of collapse of the bending alignment can be suppressed.

In view of suppressing collapse of the liquid crystal alignment, a previously tilted angle of the liquid crystal molecules, i.e., a pre-tilt angle, is preferably smaller. In view of achieving both suppression of collapse of the liquid crystal alignment and a high contrast ratio, the pre-tilt angle is preferably not smaller than 87° and smaller than 90°.

The specific method for providing a pre-tilt angle to the liquid crystal molecules is not particularly restricted. A method using photo alignment or of the technique (7) is preferable.

As described above, the technique (7) likewise enables easy change in the liquid crystal alignment and alleviates the strain of the liquid crystal director due to voltage application to the comb-shaped electrode 16. As a result, collapse of the bending alignment can be suppressed.

In view of assuredly suppressing collapse of the liquid crystal alignment, a tilted portion is preferably tilted in a pre-tilt direction of the liquid crystal molecules. Further, in the same view, the tilt angle of the comb-shaped electrode 16 is preferably set in such a manner that the pre-tilt direction of the liquid crystal molecules faces a direction of a line of electric force generated when a voltage is applied.

On the other hand, in view of achieving both suppression of collapse of the liquid crystal alignment and a high contrast ratio, the tilt angle of the comb-shaped electrode 16 is preferably set in such a manner that the pre-tilt angle of the liquid crystal layer falls within the range of 87° or above and less than 90°.

As described above, according to the liquid crystal display device of the present embodiment, a display defect due to collapse of the liquid crystal alignment can be suppressed.

In Embodiment 1, the description has been given as to the example where the p-type nematic liquid crystal material containing the p-type nematic liquid crystal is used as the liquid crystal material. Here, the liquid crystal material of the present invention is not particularly restricted as long as it contains a p-type liquid crystal material.

Moreover, in the liquid crystal display device of Embodiment 1, a distribution of electric field intensity is formed in a cell by electric field application, and thus the bend alignment of the liquid crystal is achieved. In Embodiment 1, the liquid crystal material having a high refractive index anisotropy $\Delta n$ or the liquid crystal having a high dielectric anisotropy $\Delta \in$ is preferably used. Examples of such a p-type liquid crystal material include CN (cyano)-based liquid crystal materials (chiral nematic-based liquid crystal materials) and F (fluorine)-based liquid crystal materials.

The present invention will be described in more detail hereinafter based on examples with reference to the drawings.

EXAMPLE 1

Figure 4:
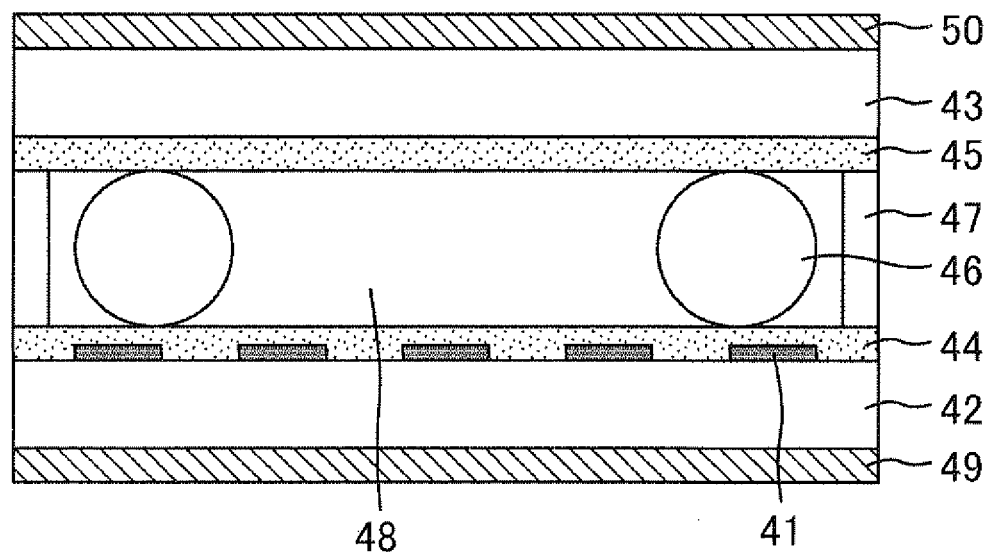
FIG. 4 is a cross-sectional schematic view showing a basic configuration of a liquid crystal display element according to Example 1.

FIG. 4 shows a basic configuration of a liquid crystal display element used in a liquid crystal display device of Example 1. First, a polyimide homeotropic alignment film JALS-204 (JSR Corp., 5 wt. %, a γ-butyrolactone solution) was applied to a glass substrate (a lower substrate) 42 that has a comb-shaped electrode 41 comprising ITO by spin-coating. Then, the workpiece was baked at 200° C. for two hours. The film thickness of an alignment film (an alignment layer) 44 was 60 nm in this case.

In not only Example 1 but also all the examples, the electrode width was set to 4 μm, the electrode spacing was set to 4 μm, and the cell gap was set to 4 μm. Alignment disorder of the liquid crystal depends on electric field intensity. Since the effects of the present invention can be well understood by experiments with a narrower spacing, the electrode spacing (4 μm) that is relatively narrow among normally used electrode spacings was used in all the examples.

Likewise, an alignment film (an alignment layer) 45 comprising the same material as that of the alignment film 44 was formed on a glass substrate 43 (an upper substrate). Then, 4-micron resin beads 46 (micro pearls SF, Sekisui Chemical Co., Ltd.) were dispersed on the substrate 42. Subsequently, a seal resin (Mitsui Chemicals, Inc.: Struct Bond XN-21-S) was printed on the substrate 43 to bond both the substrates 42 and 43 to each other. Then, the workpiece was baked at 250° C. for three hours, thereby fabricating a liquid crystal cell.

Figure 5:
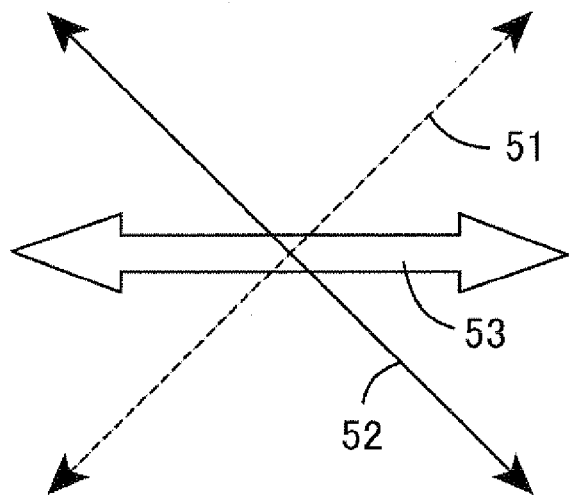
FIG. 5 is a plan view for explaining a transmission axis orientation and an electric field applying direction in the liquid crystal display device of Example 1.
Figure 6:
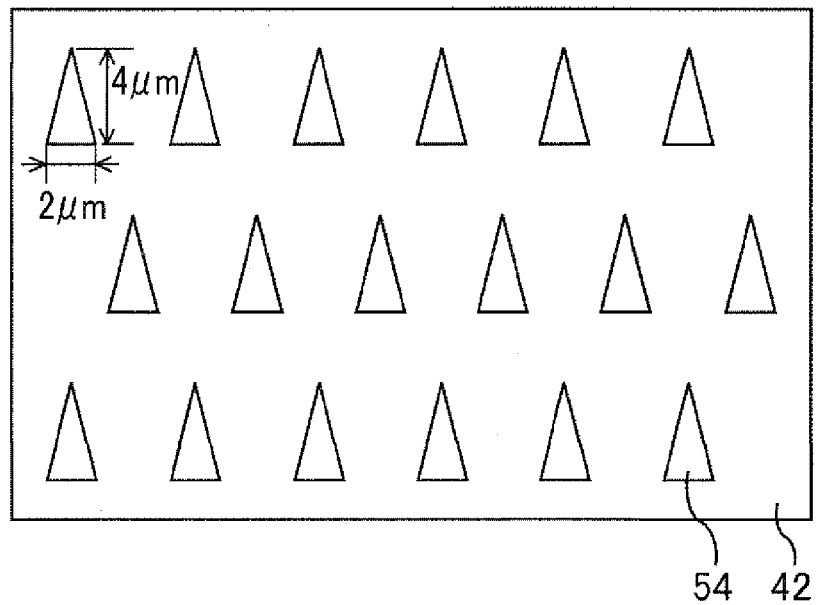
FIG. 6 are schematic views showing fine structures in a liquid crystal display element of Example 6, where
Figure 6:
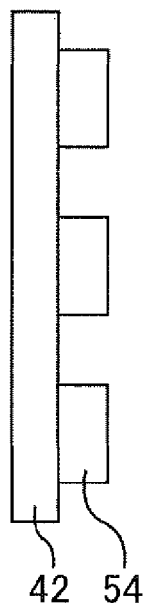
Figure 6:
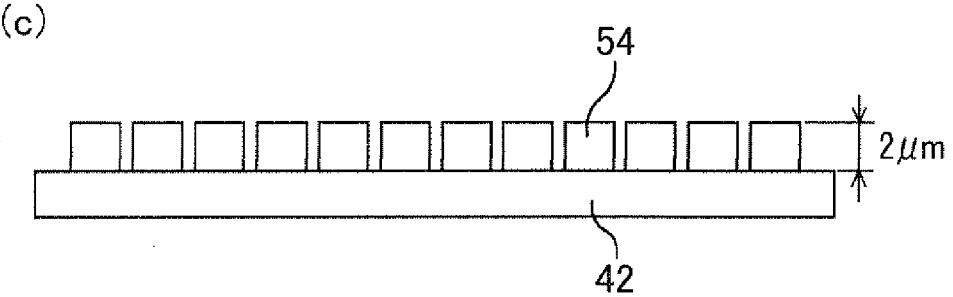

Thereafter, various liquid crystal compositions shown in the following Table 1 were hermetically put by vacuum injection, and polarizers 49 and 50 were bonded to fabricate liquid crystal display elements [1] to [5]. FIG. 5 shows the relationship between the direction of electric field application and axial orientations of the polarizers 49 and 50 in this case. A transmission axis orientation 51 of the polarizer 49 on the lower substrate side is orthogonal to a transmission axis orientation 52 of the polarizer 50 on the upper substrate side, and an electric field applying direction 53 passes the middle orientation between the transmission axis orientations 51 and 52.

The hermetically put liquid crystal material 48 is a mixed composition of a liquid crystal material K15 ($\Delta n=0.1816$, $\Delta \in =13.2$, a bending elastic constant k33=8.4 pN, Merck Ltd.) and a liquid crystal material ZLI-2293 ($\Delta n=0.1322$, $\Delta \in =10.0$, k33=17.9 pN, Merck Ltd.). Further, a 30-Hz rectangular wave of 20 V was applied between terminals (applied to the comb-shaped electrode 41) for one minute, and then an alignment state of the liquid crystal was evaluated after the applied voltage was removed. The Table 1 shows the results.

TABLE 1

| Liquid crystal display element | Ratio of K15 (% by weight) | Ratio of ZLI-2293 (% by weight) | Liquid crystal material k33 (pN) | Presence/absence of alignment disorder |
|---|---|---|---|---|
| [1] | 100 | 0 | 8.4 | Absence |
| [2] | 80 | 20 | 10.3 | Absence |
| [3] | 60 | 40 | 12.2 | Absence |
| [4] | 40 | 60 | 14.1 | Presence |
| [5] | 20 | 80 | 16.0 | Presence |

Figure 9:
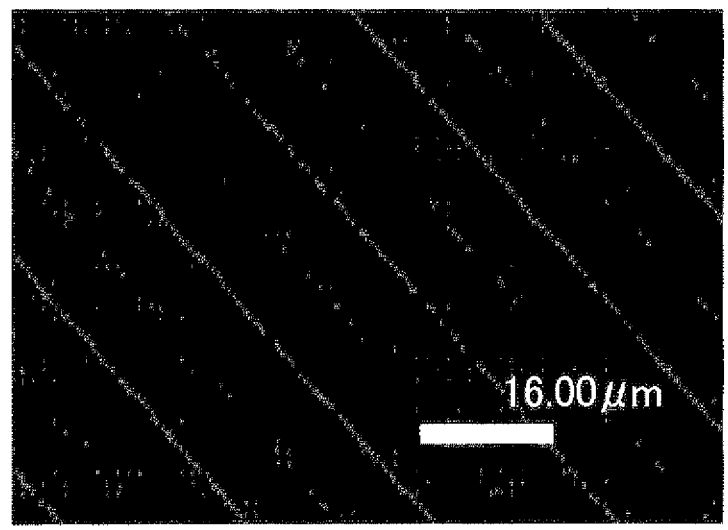
FIG. 9 is a micrograph of the liquid crystal display element according to Example 1 for explaining bend stability in the liquid crystal display element of Example 1.
Figure 10:
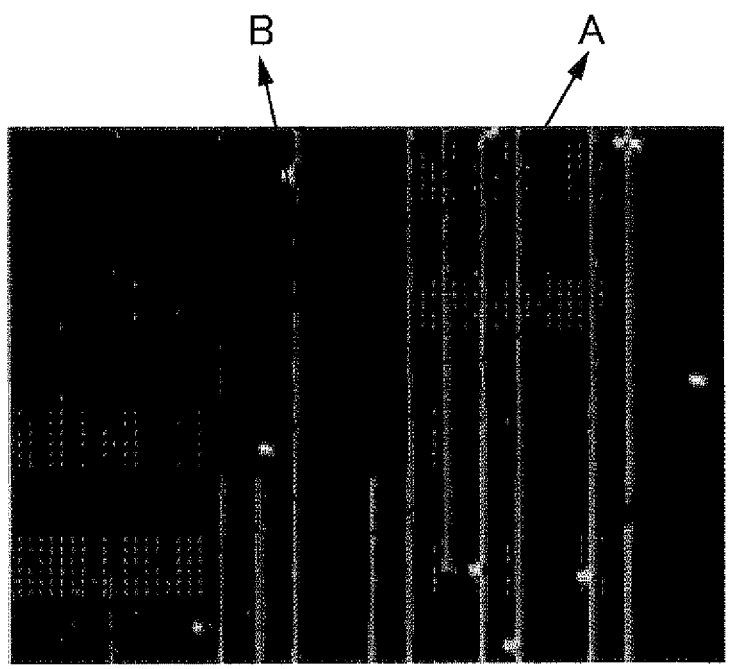
FIG. 10 is a micrograph of a liquid crystal display element in a conventional TBA mode for explaining bend stability in the liquid crystal display element in the conventional TBA mode.
Figure 11:
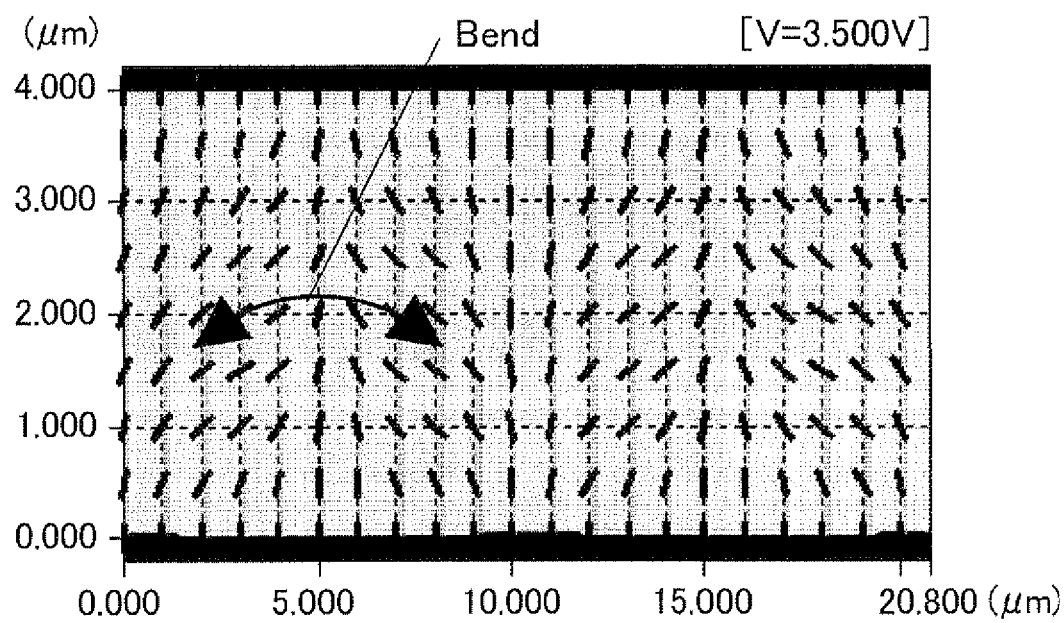
FIG. 11 is a cross-sectional schematic view of the liquid crystal display device in the TBA mode showing one example of a liquid crystal alignment when a voltage is applied.

FIG. 10 shows a micrograph of the liquid crystal display element wherein only ZLI-2293 was used as the liquid crystal material. In FIG. 10, homogeneous bend alignment (bend-shaped alignment) is formed in a region B, while bend alignment collapses in a region A. On the other hand, FIG. 9 is a micrograph of the liquid crystal display element [3]. As shown in FIG. 9, in the case that k33 of the liquid crystal material is not greater than 14 pN, such collapse of the liquid crystal alignment was not observed.

Based on the above description, it is obvious that the liquid crystal display devices in Example 1 of the present invention, especially the liquid crystal display device wherein k33 of the liquid crystal material is not greater than 14 pN, are superior in stability of the bend alignment. Thus, practicality thereof is high.

The conditions for applying a voltage to the portions between terminals were set as follows in not only Example 1 but also all the examples: a driving voltage was 20 V; a frequency was 30 Hz; and a waveform was a rectangular wave. Here, 30 Hz is a frequency adopted in existing liquid crystal displays. Further, as to the driving voltage, in general, alignment disorder is less likely to occur with a low voltage (e.g., 6 V or below), but alignment disorder tends to occur with a high voltage (e.g., 10 V or above) depending on the species of a liquid crystal material. Furthermore, if the driving voltage is approximately 20 V or higher, alignment disorder occurs 100% in a liquid crystal cell which takes no measure against alignment disorder. For such a reason, the driving voltage was set to 20 V in all the examples.

EXAMPLE 2

A basic configuration of a liquid crystal display element used in a liquid crystal display device of Example 2 is the same as that shown in FIG. 4. A liquid crystal cell having an electrode width of 4 μm, an electrode spacing of 4 μm, and a cell gap of 4 μm was fabricated by the following method.

First, a glass substrate 42 that has a comb-shaped electrode 41 comprising ITO was immersed in a 0.01-mol/l chloroform-NMP mixed solution (a mixing ratio (a volume ratio) of chloroform:NMP=1:10) containing a silane coupling material of formula (1) for five minutes. Then, this substrate was dried in dry nitrogen at 120° C. for one hour to form an alignment film (an alignment layer) 44 comprising a chemisorption film.

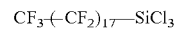

(1)

Likewise, an alignment film (an alignment layer) 45 that consists of a chemisorption film comprising the same material as that of the alignment film 44 was formed on a glass substrate 43. Subsequently, 4-micron resin beads 46 (micro pearls SP, Sekisui Chemical Co., Ltd.) were dispersed on the substrate 42. Then, a seal resin (Mitsui Chemicals, Inc., Struct Bond XN-21-S) was printed on the substrate 43 to bond both the substrates 42 and 43 to each other. Thereafter, the workplace was baked at 250° C. for three hours, thereby fabricating a liquid crystal cell.

Then, a liquid crystal material 48 (ZLI-2293, $\Delta n=0.1322$, $\Delta \in =10.0$, k33=17.9 pN, Merck Ltd.) was hermetically put by vacuum injection, and polarizers 49 and 50 were bonded to fabricate a liquid crystal display element [6].

Thereafter, a 30-Hz rectangular wave of 20 V was applied between terminals (to the comb-shaped electrode 41) in the same manner as in Example 1, whereby uniform alignment having no alignment defect was obtained.

Additionally, the anchoring energy of the alignment films 44 and 45 used in the present example measured $5 \times 10^{-5}$ J/m². In Example 1, the anchoring energy of the liquid crystal display element [5] fabricated was $4 \times 10^{-4}$ J/m², and the liquid crystal alignment was collapsed by application of the 30-Hz rectangular wave of 20 V.

As obvious from the above description, the bend alignment of the liquid crystal display device of Example 2 according to the present invention is not collapsed even though a high voltage is applied, and a practical value thereof is high.

The reason the liquid crystal display device of the present example shows stable bend alignment can be considered as follows. That is, when a voltage is applied and bend alignment is formed, strain energy is stored. On the other hand, in the case of a low-anchoring-energy film, liquid crystal molecules on an alignment film interface can relatively easily move. Therefore, it can be probably considered that the strain energy can be well alleviated in the case of the low-anchoring-energy film.

Further, each of the alignment films (the chemisorption films) 44 and 45 in the present example is a monomolecular adsorption film, and this film can be uniformly formed by just immersing the substrate in a solution. Therefore, according to the monomolecular adsorption film, the uniform alignment film can be obtained, and a film forming process of the alignment films can be extremely simplified.

On the other hand, in conventional display modes, a certain pre-tilt angle must be provided, but the pre-tilt angle is not easily controlled by the monomolecular adsorption film. In the display mode according to the present invention, however, substantially homeotropic alignment of the liquid crystal molecules can suffice, and the precise pre-tilt angle control is not required. Therefore, the monomolecular adsorption film is very suitable for the display mode according to the present invention.

Further, the monomolecular adsorption film is a molecular-level super-thin film and voltage loss due to the alignment film is small. Therefore, this film is suitable for the display mode according to the present invention.

EXAMPLE 3

A liquid crystal display element [7] of Example 3 was fabricated in the same manner as in Example 2 except that a material having a configuration of formula (2) was used as a silane coupling material.

(2)

Then, a 30-Hz rectangular wave of 20 V was applied between terminals (to comb-shaped electrode 41) in the same manner as in Example 1, and an alignment state at this time was observed using a microscope, whereby uniform bend alignment was confirmed. The anchoring energy of the liquid crystal display element [7] measured in the same manner as in Example 2, and it was $1 \times 10^{-4}$ J/m².

EXAMPLE 4

A basic configuration of a liquid crystal display element used in a liquid crystal display device of Example 4 is the same as that shown in FIG. 4. Additionally, a liquid crystal cell having an electrode width of 4 μm, an electrode spacing of 4 μm, and a cell gap of 4 μm was fabricated by the following method.

First, in the same manner as in Example 2, a glass substrate 42 that has a comb-shaped electrode 41 comprising ITO was immersed in a 0.01-mol/l chloroform-NMP mixed solution (a mixing ratio (a volume ratio) of chloroform:NMP=1:10) containing a compound of formula (3) for five minutes. Then, this substrate was dried in dry nitrogen at 80° C. for one hour to form an alignment film (an alignment layer) 44 comprising a chemisorption film. An alignment film (an alignment layer) 45 comprising the same material as that of the alignment film 44 was formed on a glass substrate 43.

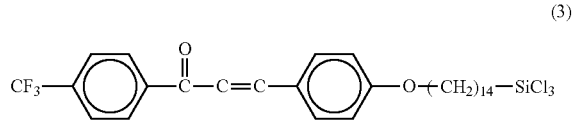

(3)

Thereafter, 4-micron resin beads 46 (micro pearls SP, Sekisui Chemical Co., Ltd.) were dispersed on the substrate 42. Then, a seal resin (Mitsui Chemicals, Inc., Struct Bond XN-21-S) was printed on the substrate 43 to bond both the substrates 42 and 43 to each other. Then, the workpiece was baked at 250° C. for three hours, thereby fabricating a liquid crystal cell.

Subsequently, a liquid crystal material 48 (ZLI-2293, $\Delta n=0.1322$, $\Delta \in =10.0$, k33=17.9 pN, Merck Ltd.) was hermetically put by vacuum injection, and polarizers 49 and 50 were bonded to fabricate a liquid crystal display element [8].

In the same manner as in Example 1, a 30-Hz rectangular wave of 20 V was applied between terminals (to the comb-shaped electrode 41), and an alignment state at this time was observed using a microscope. The formed bend alignment was homogeneous. Further, the alignment was not disarrayed even though application and interruption of a voltage were repeated. The anchoring energy of the alignment films 44 and 45 was measured in the same manner as in Example 2, and it was $2 \times 10^{-5}$ J/m².

As described above, it is obvious that the liquid crystal display device of Example 4 according to the present invention has excellent bend alignment stability, and the practicality thereof is high.

EXAMPLE 5

Liquid crystal display elements [9] to [13] of Example 5 each were fabricated in completely the same manner as Example 1 except that an alignment film material and a film forming process of alignment films were different. The liquid crystal material used was ZLI-2293. The alignment film material used was a material obtained by mixing a polyimide material having a high anchoring energy and a fluorinated material (a material having fluorine introduced therein) having a low anchoring energy at a predetermined ratio was used, and a built-up film was formed on each of substrates 42 and 43 by the LB method.

A method of preparing the polyimide material will be described hereinafter.

First, 5 mmol of tetracarboxylic dianhydride of formula (4) and 5 mmol of diamine of formula (5) were agitated in 20 ml of dehydrated N,N-dimethylacetamide at 25° C. for three hours to be condensation-polymerized, thereby obtaining polyamide acid of formula (6). Then, the polyamide acid of formula (6) and N,N-dimethylhexadecylamine of formula (7) were reacted in a mixed solution of N,N-dimethylacetamide:benzene (a mixing ratio (a volume ratio) of N,N-dimethylacetamide:benzene=1:1), thereby obtaining an alkylamine salt of the polyamide acid of formula (8). This alkylamine salt of the polyamide acid was built up on each of the substrates 42 and 43 by the LB method. Build-up conditions were as follows: a surface pressure of 15 mN/m; a pulling rate of 15 mm/min; and a build-up temperature of 20° C. Subsequently, these built-up films were immersed in a mixed solution of acetic anhydride, pyridine, and benzene (a mixing ratio (a volume ratio) of acetic anhydride:pyridine:benzene=1:1:3) together with the substrates 42 and 43 for 12 hours, thereby obtaining built-up films (alignment films (alignment layers) 44 and 45) of polyimide (which will be abbreviated as PI) of formula (9).

A perfluoropolyether (PFPE) of formula (10) was used as a fluorinated film, and alignment films (alignment layers) 44 and 45 were likewise formed on substrates 42 and 43 by the LB method, respectively. However, in the present example, the material used satisfied m=6 and n=5.

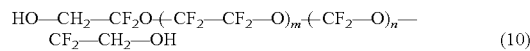

(10)

In the formula, m is an integer of 0 to 30, and n is an integer of 0 to 30.

At this time, the amounts of the polyimide material (PI) and the fluorinated material (PFPE) were changed as shown in the following Table 2 to control the anchoring energy of the alignment film. Thereafter, in the same manner as in Example 1, a 30-Hz rectangular wave of 20 V was applied between terminals (to the comb-shaped electrode 41).

TABLE 2

| Liquid crystal display element | Ratio of PI (% by weight) | Ratio of PFPE (% by weight) | Anchoring energy (J/m$^2$) | Presence/absence of alignment disorder |
|---|---|---|---|---|
| [9] | 80 | 20 | $3.3 \times 10^{-4}$ | Presence |
| [10] | 60 | 40 | $1.7 \times 10^{-4}$ | Presence |
| [11] | 40 | 60 | $4.1 \times 10^{-5}$ | Absence |
| [12] | 20 | 80 | $8.5 \times 10^{-6}$ | Absence |
| [13] | 0 | 100 | $1.0 \times 10^{-6}$ | Absence |

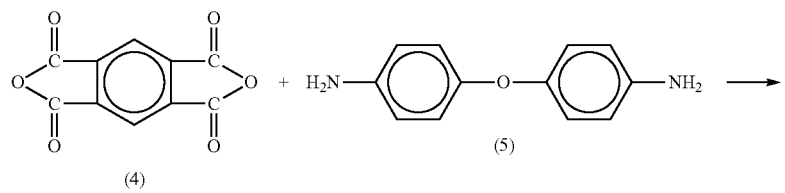

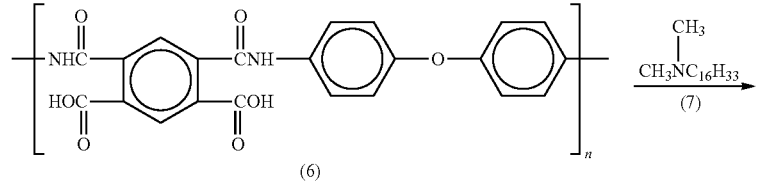

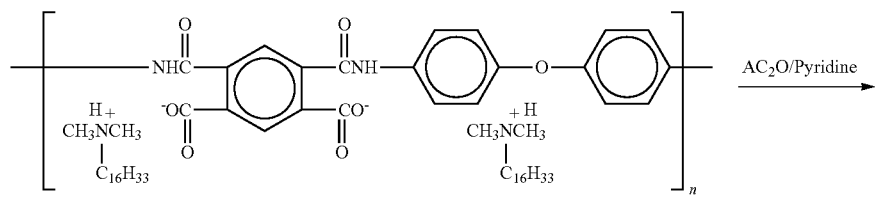

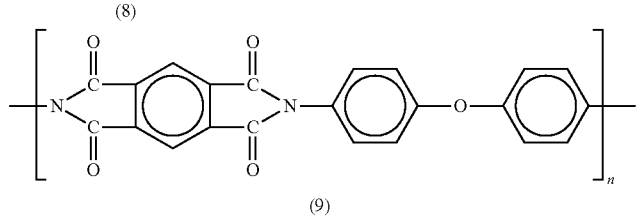

As obvious from Example 3 and Table 2, the bending alignment did not collapse even though the voltage of 20 V was applied in the case that the anchoring energy was 1.5× $10^{-4}$ J/m$^2$ or below. On the other hand, the bending alignment collapsed in the case that the anchoring energy was greater than $1.5 \times 10^4$ J/m$^2$.

Further, in the case that the anchoring energy is smaller than $1 \times 10^{-6}$ J/m$^2$, the bending alignment formed by voltage application may not be returned to the alignment before the voltage application even after the voltage was canceled, and another alignment state may be provided in some cases. That is, in such a case, the memory effect may be exerted, which is not preferable from the practical view.

In the respective examples, the pre-tilt angle is not required to be precisely controlled on an opposite substrate side, i.e., the substrate 43 side, and the substantially homeotropic alignment can suffice.

EXAMPLE 6

A liquid crystal display element [14] of Example 6 was fabricated in completely the same manner as Example 1 except that an alignment film material and a film forming process of alignment films were different. The liquid crystal material used was ZLI-2293.

First, a photopolymerizable monomer solution UCL-018 (DIC Corp.) was applied to a glass substrate 42 that has a comb-shaped electrode 41 comprising ITO by spin-coating. Thereafter, UV exposure through a photomask was performed, and fine structures (fine shapes) 54 each having a triangular prism shape were formed on the substrate 42. Thereby, an alignment film 44 was obtained. The fine structures 54 were two-dimensionally and uniformly formed on the entire display region including respective pixels. The pitches of the fine structures 54 in longitudinal and transverse directions were set to 2.0 µm and 3.5 µm, respectively. Further, the lengths of each fine structure 54 in the longitudinal and transverse directions were set to 4 µm and 2 µm, respectively, and the height of each fine structure 54 was set to 2 µm. Fine structures each having a triangular prism shape similarly to the fine structures 54 were also formed on the glass substrate 43. Thereby, an alignment film (an alignment layer) 45 was obtained.

A 30-Hz rectangular wave of 20 V was applied to the fabricated liquid crystal display element [14], but bend alignment did not collapse. Moreover, the anchoring energy was measured using parallel plate electrode cells (upper and lower electrode cells) having the same fine structures formed on substrates, and the value of the measured energy was 1.7× $10^{-5}$ J/m$^2$. It is generally known that the anchoring energy is one digit smaller than that of an alignment film comprising polyimide in the case that the liquid crystal is aligned by a geometric effect. Thus, such an alignment technique is suitable for the display mode according to the present invention.

In the present example, the fine structures 54 were formed on the substrate 42 by photolithography. However, it is needless to say that an alignment treatment method to be used in the present example may be any other alignment treatment method for alignment control based on, e.g., nanoimprint, stamping, or an ion beam method.

EXAMPLE 7

A liquid crystal display element [15] of Example 5 was fabricated in completely the same manner as in Example 1 except that an alignment film material and a film forming process of alignment films are different. It is to be noted that LZI-2293 was used as a liquid crystal material.

A photofunctional polyimide solution (4.8% by weight dissolved in 1:1:1 mixed solution (a volume ratio) of NMP, γ-butyrolactone, and butylcellosolve) whose polyimide molecular structure is represented by the following formula (11) was applied to a substrate 42 to form an alignment film (an alignment layer) 44. Further, an alignment film (an alignment layer) 45 comprising the same material as that of the alignment film 44 on the substrate 42 side was formed on a substrate 43. As described above, in the present embodiment, photo-alignment films were formed as the alignment films 44 and 45.

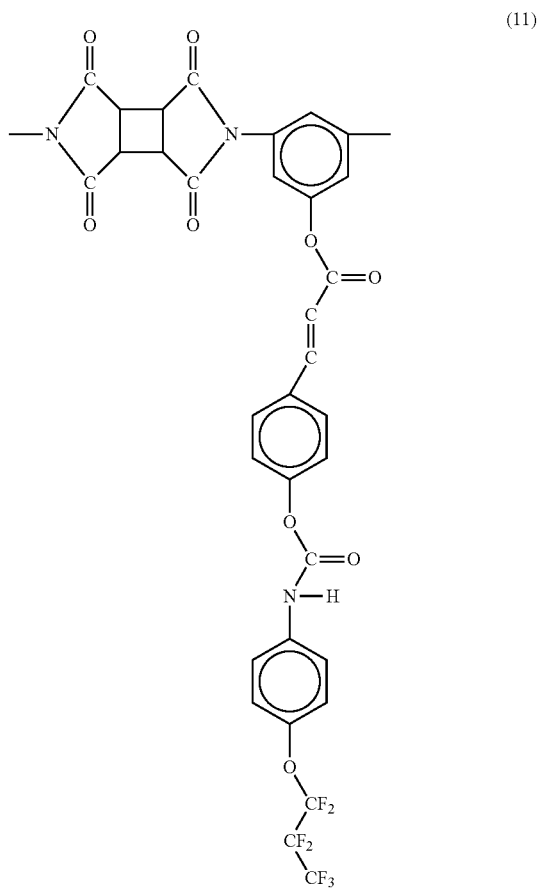

(11)

Figure 7:
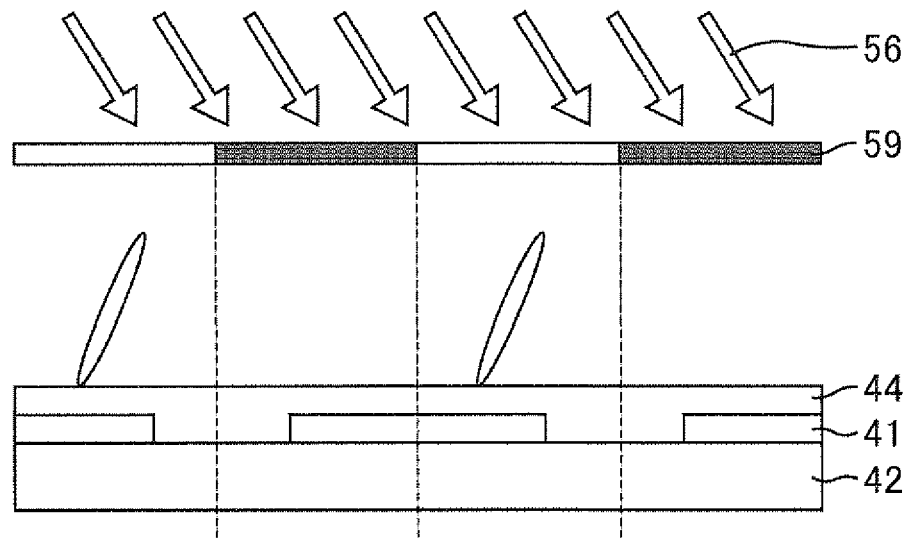
FIG. 7 are cross-sectional schematic views of a substrate according to Example 7 for explaining how two regions are formed by irradiation of polarized ultraviolet rays in Example 7, where
Figure 7:
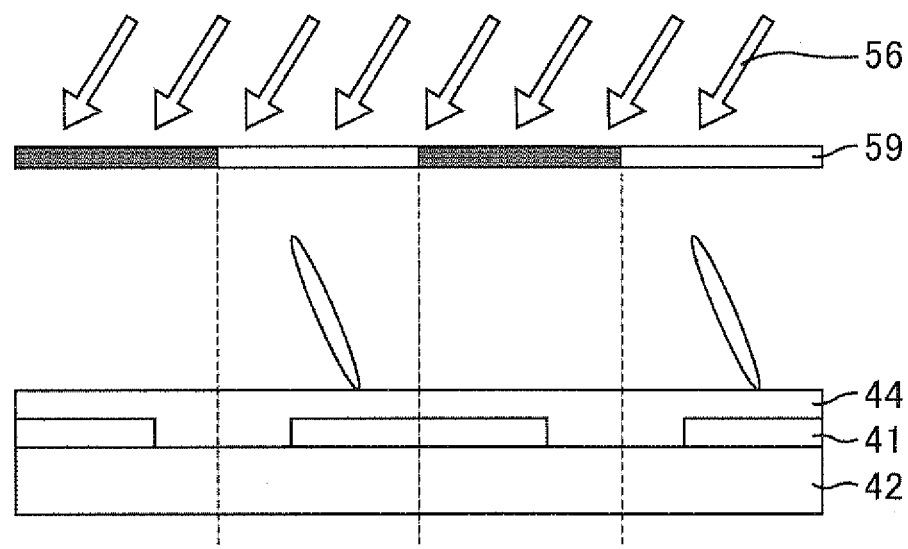
Figure 8:
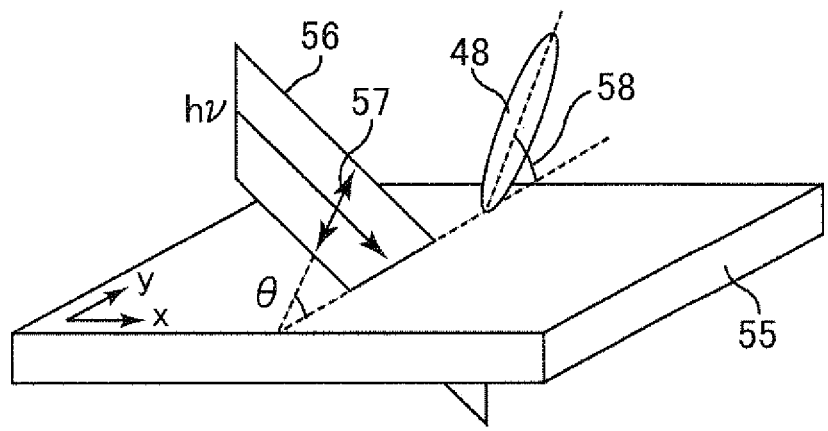
FIG. 8 is a perspective conceptual view of a substrate in Example 7 for explaining a relationship between the direction of the irradiation of the polarized ultraviolet rays and an orientation of generation of a pre-tilt angle of liquid crystal molecules.

Then, as shown in FIG. 7, polarized ultraviolet rays 56 were applied twice through a photomask 59 to form two regions (two domains) having different pre-tilt orientations (directions) on the substrate 42, thereby obtaining the alignment film 44. The exposure was carried out to the substrates and the alignment films, and liquid crystal molecules are not present at the time of the exposure; however, the liquid crystal molecules were illustrated in FIG. 7 for explanation. Each of the two regions has a pre-tilt angle of 88°, and the polarized ultraviolet rays were applied so that a tilt orientation of the liquid crystal molecules in each of the two regions was different by 180°. As shown in FIG. 8, a liquid crystal molecule (a p-type nematic liquid crystal) 48 is pre-tilted in a direction along the vibrating direction of a P wave 57 of the polarized ultraviolet rays 56, whereby a pre-tilt angle 58 appears.

In more detail, light shielding portions and slit-shaped (stripe-shaped) opening portions which correspond to the pitches of the comb-shaped electrode 16 were formed on the mask 59. The mask 59 was placed in such a manner that each of the opening portions of the mask 59 is along the central line of the comb-shaped electrode 41 in the longitudinal direction and the central line of each gap between the respective electrodes in the longitudinal direction. As a result, a pre-tilt alignment orientation also varies in accordance with the pitch of the comb-shaped electrode 16.

A 30-Hz rectangular wave of 20 V was applied to the fabricated liquid crystal display element [15], but the bend alignment did not collapse. Additionally, the anchoring energy was measured using parallel plate electrode cells (upper and lower electrode cells) that were obtained as alignment films by irradiating additionally fabricated photo-alignment films with polarized ultraviolet rays. The value thereof was $8.8 \times 10$ J/m$^2$.

In the liquid crystal display device [15] of the present invention, the liquid crystal molecules (the liquid crystal molecules near the alignment film 44, in particular) were alignment-controlled (alignment-divided), and a pre-tilt is previously formed in a direction along which the liquid crystal molecules (the liquid crystal molecules near the alignment film 44, in particular) are to be aligned when an electric field is applied. That is, the liquid crystal molecules (the liquid crystal molecules near the alignment film 44, in particular) are tilted with respect to the substrate surfaces in a direction along which a line of electric force are to be generated when no voltage is applied. Therefore, strain of a liquid crystal director due to electric field application was preferably alleviated and hence collapse of the bending alignment did not occur.

In the display mode according to the present invention, a pre-tilt angle is not required to be precisely controlled. For a high contrast ratio, the pre-tilt angle is preferably controlled to be not smaller than 87° and not greater than 90°.

Figure 14:
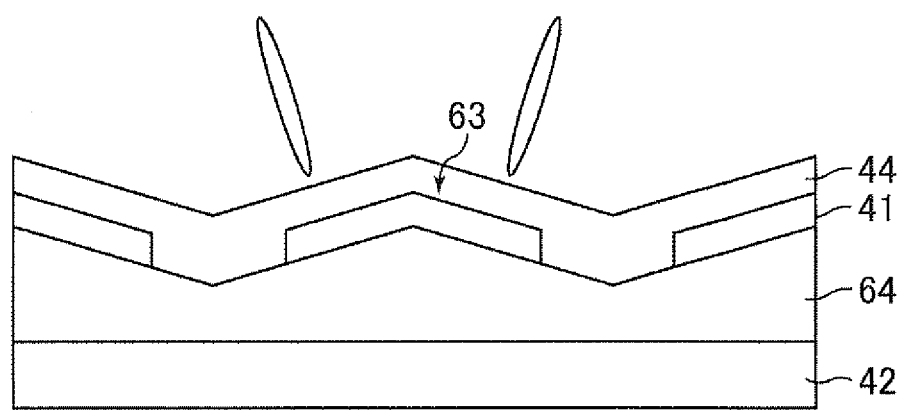
FIG. 14 is a cross-sectional plan view showing another configuration of the liquid crystal display device according to Example 7.

In the present example, the pre-tilt orientation was made different in each of the two regions. Alternatively, tilted surfaces may be formed within the surface of the substrate 42 so that the liquid crystal molecules are tilted in the electric field direction without controlling the pre-tilt orientation using the alignment films. More specifically, as shown in FIG. 14, tilted portions 63 may be provided on the surface (the upper surface) of the comb-shaped electrode 41 on the liquid crystal layer side so that the liquid crystal molecules are tilted in the electric field direction with respect to the substrate surface. As a result, strain of the liquid crystal director due to electric field application can be likewise alleviated. The surface of the comb-shaped electrode 41 on the liquid crystal display side may be tilted as follows, for example: as shown in FIG. 14, a resin layer 64 having tilted surfaces on the substrate 42 under portions where the comb-shaped electrode 41 are to be formed is formed by photolithography; and then the comb-shaped electrode 41 is formed. In order to form the resin layer 64 having the tilted surfaces, a photomask having a halftone portion or a gray tone portion can be used.

Embodiment 2

A liquid crystal display device of the present embodiment is different from Embodiment 1 in the following points.

Figure 12:
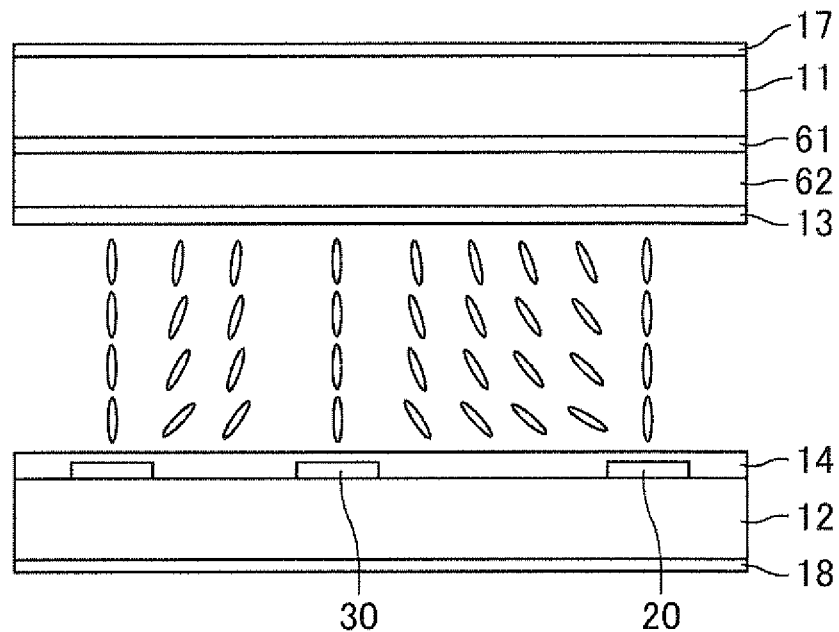
FIG. 12 is a cross-sectional schematic view showing a configuration of a liquid crystal display device according to Embodiment 2.

That is, the liquid crystal display device of the present embodiment has an opposite electrode on the upper substrate side. Specifically, as shown in FIG. 12, an opposite electrode 61, a dielectric layer (an insulating layer) 62, and an alignment layer 13 are laminated on a main surface of a substrate (an upper substrate) 11 on a liquid crystal layer side in the mentioned order. A color filter layer including red, green, and blue color filters, a black matrix (BM), and others may be provided between the opposite electrode 61 and the substrate 11.

The opposite electrode 61 comprises a transparent conductive film comprising, e.g., ITO or IZO. The opposite electrode 61 and the dielectric layer 62 are formed so as to cover at least the entire display region in a seamless manner. A predetermined potential common to respective pixels (or sub-pixels) is applied to the opposite electrode 61.

The dielectric layer 62 comprises a transparent insulating material. Specifically, this layer comprises, e.g., an inorganic insulating film comprising a silicon nitride or the like, or an organic insulating film comprising an acrylic resin or the like.

On the other hand, in the same manner as in Embodiment 1, a comb-shaped electrode including a pixel electrode group 20 and a common electrode group 30 and an alignment layer 14 are provided to a substrate (a lower substrate) 12. Moreover, polarizers 17 and 18 are disposed on outer main surfaces of the two substrates 11 and 12.

Unless black display appears, different voltages are applied between the pixel electrode group 20, and the common electrode group 30 and the opposite electrode 61. The common electrode group 30 and the opposite electrode 61 may be grounded; the common electrode group 30 and the opposite electrode 61 may be supplied with voltages having the same intensity and the same polarity, or may be supplied with voltages having different intensities and different polarities.

The liquid crystal display device of the present embodiment can likewise suppress a display defect caused due to collapse of the liquid crystal alignment. Further, formation of the opposite electrode 61 can increase a response speed.

Figure 13:
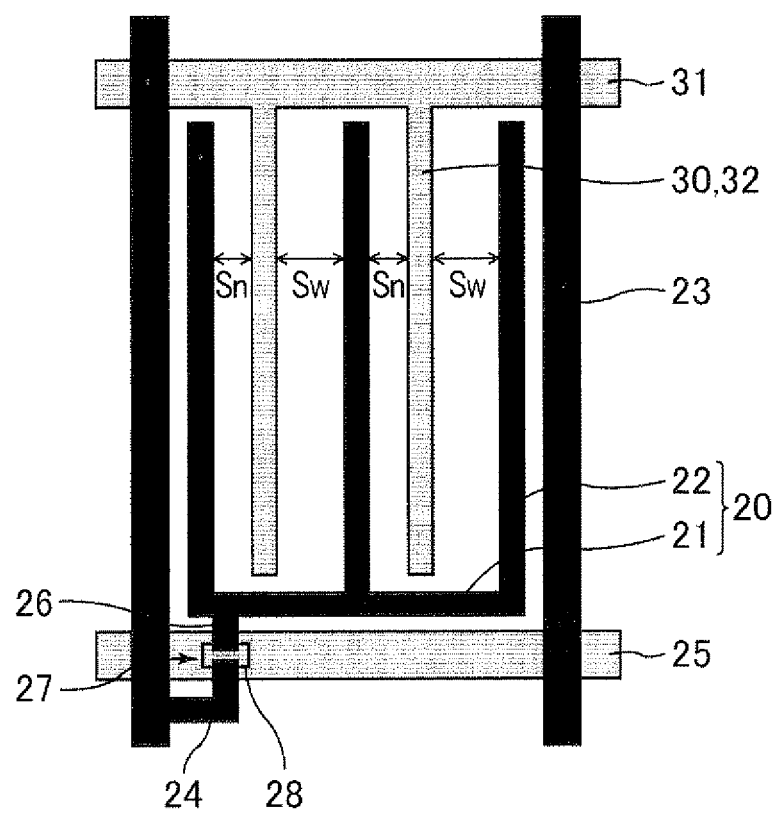
FIG. 13 is a plan schematic view showing the configuration of the liquid crystal display device according to Embodiment 1 or 2.

FIG. 13 shows a specific example of the pixel configuration in Embodiments 1 and 2. The pixel may consist of sub-pixels with multiple colors. The following structure represents a sub-pixel, in this case. When the liquid crystal display element is seen from the front side, i.e., when the pair of substrate surfaces are seen from the front side, a 3-o'clock direction, a 12-o'clock direction, a 9-o'clock direction, and a 6-o'clock direction are determined as a 0° direction (azimuth), a 90° direction (azimuth), a 180° direction (azimuth), and a 270° direction (azimuth), respectively; the direction passing through the 3-o'clock position and the 9-o'clock position is determined as a horizontal direction, and the direction passing through the 12-o'clock position and the 6-o'clock position is determined as a vertical direction.

On a main surface of the substrate 12 on the liquid crystal layer side are provided signal lines 23, scanning lines 25, a common wiring 31, thin-film transistors (TFTs) 27 that are switching elements (active elements) and individually provided for each pixel, the pixel electrode groups 20 individually provided for each pixel, and the common electrode group 30 provided in common to multiple pixels (e.g., all pixels).

The scanning lines 25, the common wiring 31, and the common electrode groups 30 are provided on the substrate 12. On the scanning lines 25, the common wiring line 31, and the common electrode groups 30 is provided a gate insulating film (not shown). The signal lines 23 and the pixel electrode groups 20 are provided on the gate insulating film. On the signal lines 23 and the pixel electrode groups 20 is provided the alignment layer 14.

The common wiring 31, the common electrode groups 30, and the pixel electrode groups 20 may be patterned by photolithography using the same film in the same process, and may be disposed on the same layer (the same insulating film).

The signal lines 23 are linearly provided in parallel to each other and extend in the vertical direction between pixels adjacent to each other. The scanning lines 25 are linearly provided in parallel to each other and extend in the horizontal direction between pixels adjacent to each other. Each signal line 23 and each scanning line 25 are orthogonal to each other, and a region defined by the signal lines 23 and the scanning lines 25 serves as substantially one pixel region. The scanning line 25 also functions as a gate of the TFT 27 in the display region.

The TFT 27 is provided near an intersecting portion of the signal line 23 and the scanning line 25 and includes a semiconductor layer 28 formed into an island shape on the scanning line 25. Further, the TFT 27 has a source electrode 24 that functions as a source and a drain electrode 26 that functions as a drain. The source electrode 24 connects the TFT 27 to the signal line 23, and the drain electrode 26 connects the TFT 27 to the pixel electrode group 20. The source electrode 24 and the signal line 23 are pattern-formed from the same film, whereby these members are connected to each other. The drain electrode 26 and the pixel electrode group 20 are pattern-formed from the same film, whereby these members are connected to each other.

The signal line 23 supplies a pixel signal to the pixel electrode group 20 at predetermined timings when the TFT 27 is in an ON state. On the other hand, a predetermined potential (a common signal) common to the respective pixels is applied to the common wiring line 31 and the common electrode group 30.

The pixel electrode group 20 has a comb shape in plan, and the pixel electrode group 20 has a linear base portion (a pixel base portion 21) and multiple linear pixel electrodes (pixel comb-tooth portions 22). The pixel base portion 21 is provided along a short side (a lower side) of the pixel. The respective pixel comb-tooth portions 22 are connected to the pixel base portion 21 so that they are connected to each other. Moreover, the respective pixel comb-tooth portions 22 extend toward the opposite short side (the upper side) from the pixel base portion 21, i.e., in the substantially 90° direction.

The common electrode group 30 includes a comb shape in a plan view, and it has multiple linear common electrodes (common comb-tooth portions 32). The common comb-tooth portions 32 and the common wiring 31 may be pattern-formed from the same film, whereby these members are connected to each other. That is, the common wiring 31 also serves as a base portion (a common base portion) of the common electrode group 30 that connects the common comb-tooth portions 32 to each other. The common wiring 31 is linearly provided in parallel to the scanning line 25 and extends in the horizontal direction between pixels adjacent to each other. The common comb-tooth portions 32 extends toward the opposite lower side of the pixel from the common wiring 31, i.e., in the substantially 270° direction.

As described above, the pixel electrode group 20 and the common electrode group 30 are oppositely arranged so that their comb teeth (the pixel comb-tooth portions 22 and the common comb-tooth portions 32) mesh with each other. Additionally, the pixel comb-tooth portions 22 and the common comb-tooth portions 32 are arranged in parallel to each other, and they are also alternately arranged at intervals.

Further, in the example shown in FIG. 13, a single pixel has two domains having opposite tilt directions of the liquid crystal molecules. The number of the domains is not particularly restricted and may be appropriately set. Four domains may be formed in one pixel in view of acquiring good viewing angle characteristics.

Furthermore, in the example shown in FIG. 13, a single pixel has two or more regions having different electrode spacings. In more detail, each pixel has regions having a relatively narrow electrode spacing (regions with a spacing Sn) and regions having a relatively wide electrode spacing (regions with a spacing Sw). Thus, the respective regions can have different threshold values of VT characteristics, and a gradient of the VT characteristics in the entire pixel particularly at low tones can be made mild. As a result, occurrence of white-floating can be suppressed and the viewing angle characteristics can be improved. The white-floating means a phenomenon that an image which should be darkly displayed is rendered whitely when an observing direction is inclined from the front side to an oblique direction in a state that a relatively dark image at low tones is displayed.

The present application claims priority to Patent Application No. 2009-127932 filed in Japan on May 27, 2009 and Patent Application No. 2010-6689 filed in Japan on Jan. 15, 2010 under the Paris Convention and provisions of national law in a designated State, the entire contents of which are hereby incorporated by reference.

EXPLANATION OF SYMBOLS 11, 12, 42, 43: substrate
13, 14, 44, 45: alignment layer (alignment film)
15, 48: liquid crystal (p-type nematic liquid crystal)
16, 41: electrode (comb-shaped electrode)
20: pixel electrode group
21: pixel base portion
22: pixel comb-tooth portion (pixel electrode)
23: signal line
24: source electrode
25: scanning line
26: drain electrode
27: TFT
28: semiconductor layer
30: common electrode group
31: common wiring (common base portion)
32: common comb-tooth portion 32 (common electrode)
17, 18, 49, 50: polarizer
46: spherical spacer
47: seal
51: transmission axis orientation of the polarizer on a lower substrate side
52: transmission axis orientation of the polarizer on an upper substrate side
53: direction of electric field application
54: fine structure (irregularities)
55: photo-alignment film
56: polarized ultraviolet ray
57: P wave
58: pre-tilt angle
59: photomask
61: opposite electrode
62: dielectric layer
63: tilted portion
64: resin layer

The invention claimed is:
1. A liquid crystal display device comprising
a liquid crystal display element including
a pair of substrates, and
a liquid crystal layer hermetically interposed between the pair of substrates,
the liquid crystal layer including a p-type liquid crystal material that is homeotropically aligned with respect to surfaces of the pair of substrates when no voltage is applied,
one of the pair of substrates comprising a comb-shaped electrode and a first alignment layer configured to control alignment of the p-type liquid crystal material, the other of the pair of substrates comprising a second alignment layer configured to control alignment of the p-type liquid crystal material, and the first alignment layer having an anchoring energy of not greater than $1.5 \times 10^{-4}$ J/m².

2. The liquid crystal display device according to claim 1, wherein the anchoring energy of the first alignment layer is not greater than $1 \times 10^{-4}$ J/m².

3. The liquid crystal display device according to claim 1, wherein the second alignment layer has an anchoring energy of not greater than $1.5 \times 10^{-4}$ J/m².

4. The liquid crystal display device according to claim 3, wherein the anchoring energy of the second alignment layer is not greater than $1 \times 10^{-4}$ J/m².

5. The liquid crystal display device according to claim 1, wherein the first alignment layer comprises an alignment film having a fluorine-containing group.

6. The liquid crystal display device according to claim 1, wherein the second alignment layer comprises an alignment film having a fluorine-containing group.

7. The liquid crystal display device according to claim 5, wherein the fluorine-containing group is a $CF_2$ group.

8. The liquid crystal display device according to claim 1, wherein the first alignment layer comprises a chemisorption film.

9. The liquid crystal display device according to claim 1, wherein the second alignment layer comprises a chemisorption film.

10. The liquid crystal display device according to claim 1, wherein the first alignment layer has irregularities configured to control alignment of the p-type liquid crystal material on its surface that is in contact with the liquid crystal layer.

11. The liquid crystal display device according to claim 1, wherein the second alignment layer has irregularities configured to control alignment of the p-type liquid crystal material on its surface that is in contact with the liquid crystal layer.

12. The liquid crystal display device according to claim 10, wherein the irregularities are two-dimensionally arrayed in a pixel.

13. The liquid crystal display device according to claim 10, wherein the liquid crystal layer has a pre-tilt formed by the irregularities when no voltage is applied.

14. The liquid crystal display device according to claim 1, wherein a liquid crystal material constituting the liquid crystal layer has a bending elastic constant k33 satisfying $k33 \leq 14$ pN.

15. The liquid crystal display device according to claim 14, wherein the bending elastic constant k33 satisfies $k33 \leq 13$ pN.

16. The liquid crystal display device according to claim 15, wherein the bending elastic constant k33 satisfies $k33 \leq 12.5$ pN.

17. The liquid crystal display device according to claim 1, wherein the p-type liquid crystal material includes liquid crystal molecules that are previously tilted when no voltage is applied in a direction along which they are designed to be tilted by voltage application.

18. The liquid crystal display device according to claim 17, wherein the liquid crystal molecules are adjacent to the first alignment layer.

19. The liquid crystal display device according to claim 1, wherein the comb-shaped electrode has a tilted portion on its surface on the liquid crystal layer side.

20. The liquid crystal display device according to claim 19, wherein the tilted portion tilts in a direction along which liquid crystal molecules included in the p-type liquid crystal material are designed to be tilted by voltage application.

21. The liquid crystal display device according to claim 1, wherein the liquid crystal layer has a pre-tilt angle of not smaller than 87° and smaller than 90°.

22. The liquid crystal display device according to claim 1, wherein the p-type liquid crystal material is a p-type nematic liquid crystal material.

\* \* \* \* \*